C. W. DICKINSON.
PLOW.
APPLICATION FILED FEB. 17, 1908.
1,076,752.
Patented Oct. 28, 1913.
2 SHEETS—SHEET 1.
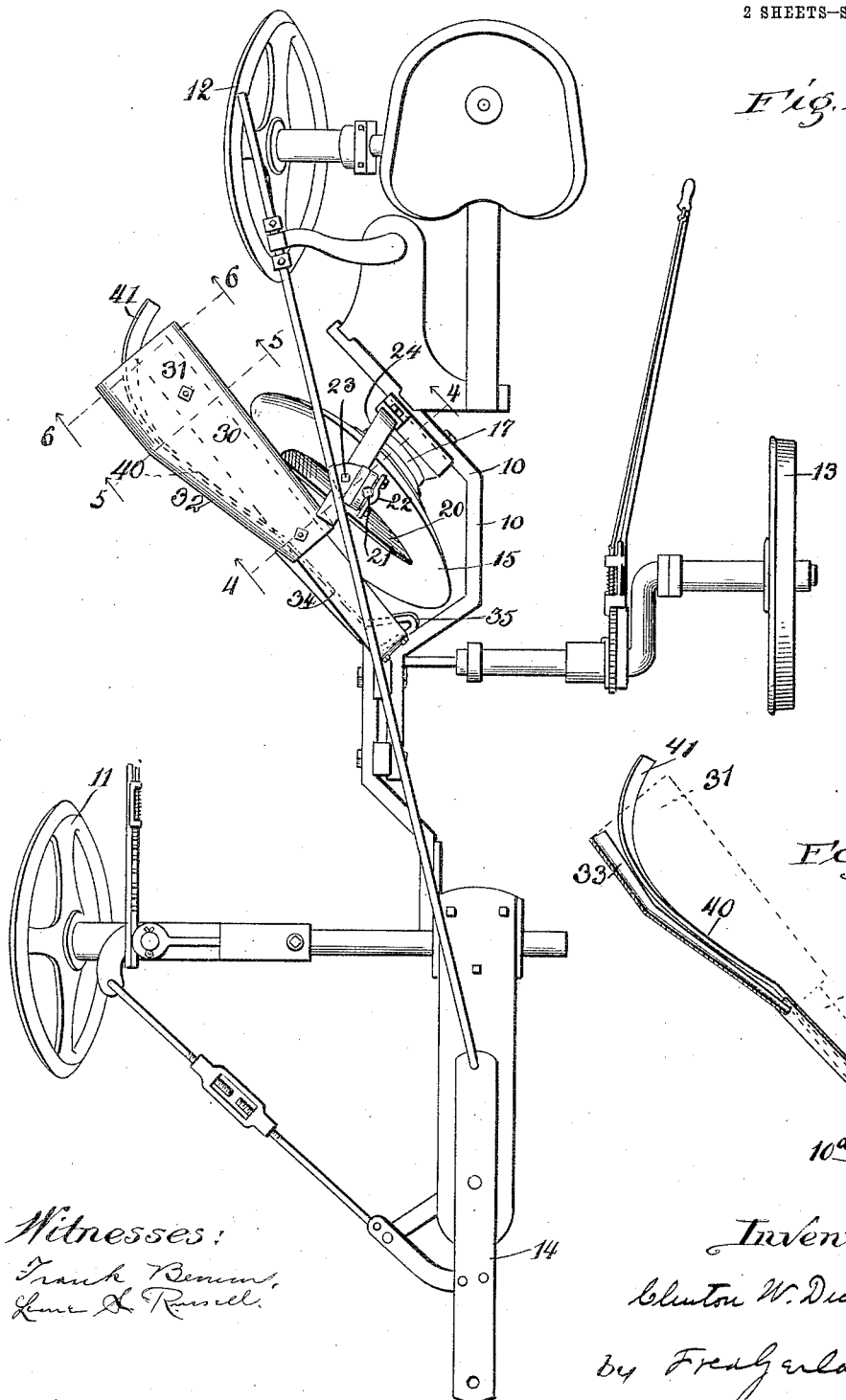

C. W. DICKINSON.
PLOW.
APPLICATION FILED FEB. 17, 1908.
1,076,752.
Patented Oct. 28, 1913.
2 SHEETS—SHEET 2.
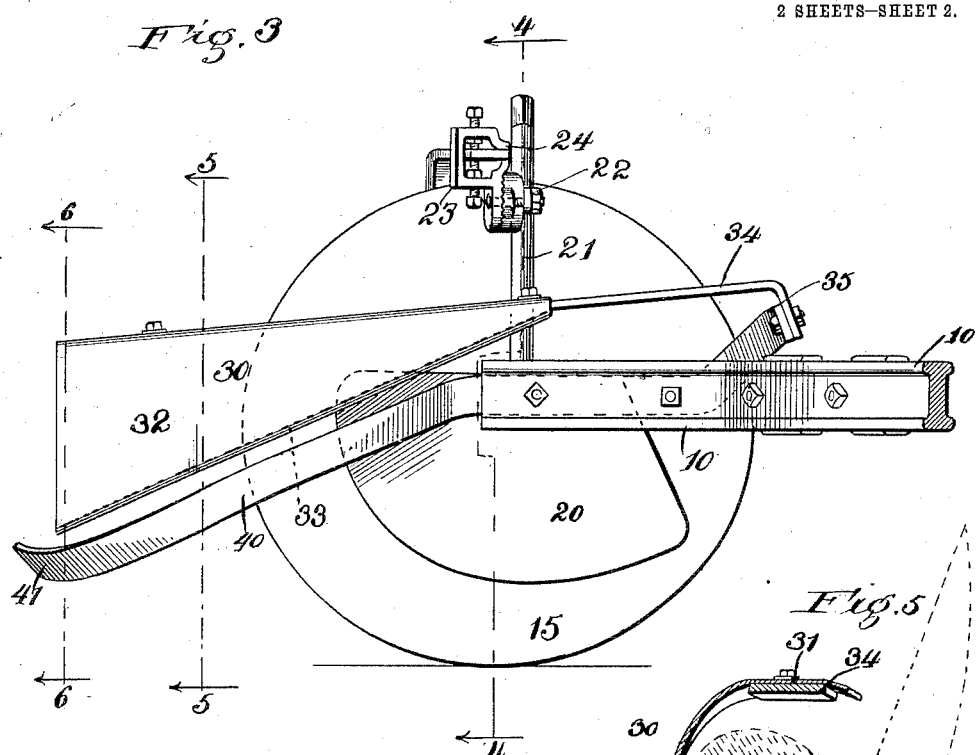
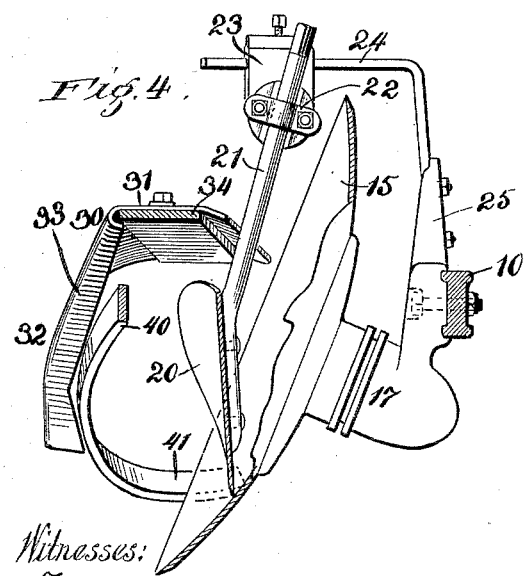
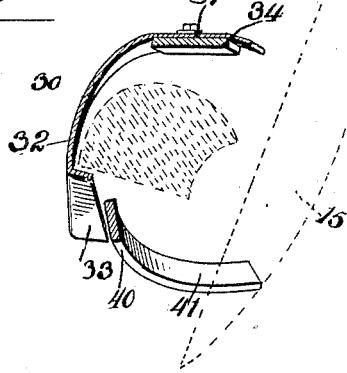
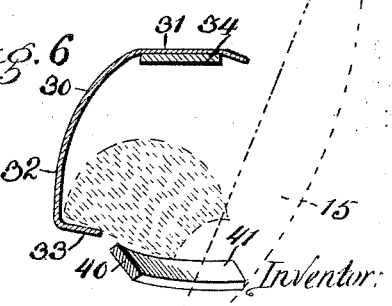

UNITED STATES PATENT OFFICE.

CLINTON W. DICKINSON, OF LA CROSSE, WISCONSIN.

PLOW.

1,076,752.
Specification of Letters Patent.
Patented Oct. 28, 1913.

Application filed February 17, 1908. Serial No. 416,263.

*To all whom it may concern:*

Be it known that I, CLINTON W. DICKINSON, a resident of La Crosse, in the county of La Crosse and State of Wisconsin, have invented certain new and useful Improvements in Plows, of which the following is a full, clear, and exact description.

The invention relates to plows, and more particularly to means for controlling the delivery of a furrow-slice cut and lifted by the plow, to the ground or a previously cut furrow.

In a plow heretofore produced, there is embodied a guide which is designed to control and direct the furrow-slice cut by a concavo-convex disk, said device being movable with respect to the plow to control the delivery of furrow-slices of different sizes and to provide for the passage of irregular slices usually encountered in practice. The aforesaid plow also embodies means for limiting the turning or twisting movement of the furrow-slice so that it will be delivered in substantially true inverted position and not irregularly. The means for preventing the excessive turning of the slice was mounted on the frame and its relation to the guide for limiting the outward or upward movement of the slice was not fixed. In practice it has been found that furrow-slices under the various or different conditions of the soil, will be better held and guided against excessive turning movement when the means for restraining the turning of the slice is mounted in definite or fixed relation to the guide and at the bottom edge of the guide and that such arrangement better adapts the structure for the proper and even delivery of irregular and uneven slices or slices under different conditions.

The present invention designs to provide improved means for controlling the furrow-slice cut by the plow and consists in the several novel features hereinafter set forth and more particularly defined by claims at the conclusion hereof.

In the drawings: Figure 1 is a plan of a disk-plow embodying the invention. Fig. 2 is a detail plan of the slice-guiding means, the shield and its support being broken away to illustrate the ledge for guiding the slice. Fig. 3 is a side elevation. Fig. 4 is a section on line 4—4 of Fig. 3. Fig. 5 is a section on line 5—5 of Fig. 3. Fig. 6 is a section on line 6—6 of Fig. 3.

The invention is illustrated as embodied in a disk-plow of usual construction which comprises a frame 10 formed of members secured together, front and rear furrow wheels 11 and 12, a land-wheel 13, a draft-clevis 14, and a concavo-convex disk 15 revolubly mounted in usual manner in adjustable journals 17 so the inclination of the disk may be varied as desired. The disk, as well understood in the art, is set at an angle to the line of draft and with respect to the vertical to penetrate the soil, and cut a furrow-slice which will be lifted and turned outwardly as the disk is drawn forwardly in the soil. Usually a scraper 20 is associated with the disk and engages the concave face thereof to cut or remove the soil from the disk at such point as may be desired, and its form is similar to a mold-board to coöperate with the disk in turning the furrow-slice as desired. Scraper 20 is secured to a standard 21 which is adjustably secured to an adjustable bracket 22 whereby the scraper may be adjusted in different relations with the disk as well understood in the art. The fixed member 23 of bracket 22 is secured to an arm 24 which is extended downwardly and secured to one of the members of the main frame. These parts may be of any suitable or usual construction, the disk and scraper serving as means for cutting, lifting and turning the furrow-slice.

A guide 30 comprises a wall 31 disposed to overlie the furrow-slice as it is projected outwardly and forwardly or rearwardly by the cutting and turning means to confine the slice against excessive upward travel. Guide or shield 30 comprises a downwardly extending wall 32 on its outer side which limits the outward movement of the furrow-slice projected from the cutting and turning means. The walls 31 and 32 of the guide are adapted to receive furrow-slices projected from the disk and scraper in all conditions of soils and confine one side of the slice in a definite path to positively control its delivery to the ground. At the lower portion of the side-wall 32 of the shield is formed a stop-ledge 33 extending throughout the length of the shield and into position to provide a positive stop or guide on which the outer edge-portion of the inverted upper face of the slice will ride and whereby the slide will be positively limited against excessive turning movement. This stop and guide 33 extends inwardly at sufficient angle to the side-wall 32 to be engaged by the slice and so that the slice will be arrested by the stop.

Different slices or the same slice in different conditions, are, generally speaking, differently projected by the cutting and lifting-means. These different conditions make it necessary at times to adjust the mold-board scraper to different points on the disk, resulting in the projection of the furrow-slice in a different path. So also, irregularities in the soil must be provided for in the controlling-means. The shield is of sufficient length to receive and guide the slices as they may be differently projected under different conditions and whether the slice is projected forwardly, laterally or rearwardly with respect to the axis of the disk. In order that the shield may be properly disposed to receive and guide a thin furrow-slice so that it will also be properly disposed to receive and guide a thicker furrow-slice, the shield is mounted so its position may be varied by the thicker furrow-slice, being secured to a flexible supporting-bar 34 so it is free to yield vertically to any undue pressure of the furrow-slice against the top of the shield, thus preventing clogging and making provision for the passage of irregular or different sized furrow-slices so substantially all will be guided by the shield and ride on stop-ledge 33 without excessive disintegration of the slice. Flexible supporting-bar 34 is secured at its front end to a bar 35 which in turn is bolted to the main-frame of the plow. Resultantly, of this construction, furrow-slices differently projected by the disk or slices of different sizes, or more or less irregular in shape, will all be received by the shield and restrained against excessive turning movement by stop 33 and be guided thereby to the ground. Stop-ledge 33 extends rearwardly and downwardly to sustain and guide the outer portion of the furrow-slice as it passes under or along the side-wall of the shield and until it is in close proximity to the ground, and is effective in limiting the slice against excessive turning, whether such result from the different conditions of the soil or the different operation of the cutting and lifting-means. Furthermore, the same relation of the stop-ledge and shield is always maintained, despite any variation of the relation of the guide to the cutting and turning-means.

A bar 40 beneath guide 30 extends rearwardly and downwardly and is disposed a short distance below and inwardly of stop-ledge 33 so that if the furrow-slice should be too small to be caught and guided by stop-ledge 33, bar 40 will arrest the slice and guide it rearwardly to the ground. Thus any tendency of a small slice to turn over on its edge or excessive twisting thereof is effectively overcome by the bar 40. Adjacent the rear portion of guide 30 said bar is bent inwardly to form an arm 41 to catch and sustain the inner edge-portion of the inverted furrow-slice as the slice is being delivered to the ground and to exercise a restraining influence on the inner edge of the slice. This bar may be formed of an extension of the bar 35 to which the shield supporting-bar 34 is secured, and is slightly yielding so that the rear working end may yield slightly when unduly strained by the furrow-slice. If the slice is not turned sufficiently in transit to the ground then arm 41 guides or restrains the inner edge of the slice to deliver the slice in correct position face downward on the ground.

When the plow is in operation, the furrow-slice cut and lifted by the concavo-convex disk will be turned upwardly and outwardly and either forwardly or rearwardly, depending upon the form and relative position of the disk and mold-board scraper. The mold-board scraper and disk will project the disk upwardly and outwardly and the acquired impetus will 'cause it to continue its turning movement. In transit from the turning and lifting-means the furrow-slice will be guided by the shield 30 and the outer edge portion of the slice will be arrested by the stop-ledge 33 to positively limit the furrow-slice from excessive turning-movement and guide 30 will prevent excessive outward or upward movement thereof. By reason of the construction set forth, either an irregular furrow-slice or furrow-slices of different sizes or slices differently pitched by the plow, will all be guided and controlled so that each will be delivered onto the ground in truly inverted position and without undesired disintegration. While the furrow-slice is passing under and within the shield walls, the outer or front edge of the slice will ride along stop-ledge 33, or if an unusually small slice is cut and is not sufficiently projected outwardly, it may ride on bar 40. The slice is, in nearly all instances, guided onto the stop-ledge 33 by guide 30, and a better result is obtained when the ledge is mounted in fixed relation to said guide. As the furrow-slice reaches the rear portion of the shield, the rear curved end of bar 40 serves to sustain and guide the rear or inner edge-portion of the inverted slice and furthermore, if the slice has not been sufficiently turned before passing over said bar such portion will be restrained and guided by said bar so the slice will be sufficiently turned to prevent the slice from being laid on one of its sides. Resultantly, the structure aforesaid serves to effectively guide and control furrow-slices resulting from different conditions of the soil or operation or construction of the turning and lifting-means, so that all will be correctly delivered onto the ground and inverted.

The invention is not to be understood as restricted to the precise construction illustrated and described but may be modified within the scope of the appended claims without departing from the spirit and scope of the invention.

Having thus described the invention, what I claim as new and desire to secure by Letters Patent, is:

1. In a plow, the combination of means for cutting and turning a furrow slice, a guide separate from the cutting means disposed to limit the outward movement of the slice, and a stop at the lower part of said guide and in fixed relation thereto, said stop having a surface which is angled with respect to, and projects inwardly into the slice-path to limit the turning of the slice and to guide it downwardly to the ground.

2. In a plow, the combination of means for cutting and turning a furrow slice, a guide separate from the cutting means disposed to limit the upward movement of the slice, and a stop at the lower part of said guide and in fixed relation thereto, said stop having a surface which is angled with respect to, and projects inwardly into the slice-path to limit the turning of the slice and to guide it downwardly to the ground.

3. In a plow, the combination of means for cutting and turning a furrow slice, a guide separate from the cutting means, disposed to limit the outward and upward movement of the slice, and a stop at the lower part of said guide and in fixed relation thereto, said stop having a surface which is angled with respect to, and projects inwardly into the slice-path to limit the turning of the slice and to guide it downwardly to the ground.

4. In a plow, the combination of means for cutting and turning a furrow slice, a guide separate from the cutting means, disposed to limit the outward movement of the slice, and an inturned ledge at the bottom of said guide, disposed to arrest the slice against turning, and extending rearwardly and downwardly to direct the outer edge of the slice outwardly and downwardly.

5. In a plow, the combination of means for cutting and turning a furrow slice, a guide separate from the cutting means disposed to limit the upward movement of the slice, an an inturned ledge at the bottom of said guide, disposed to arrest the slice against turning, and extending rearwardly and downwardly to direct the outer edge of the slice outwardly and downwardly.

6. In a plow, the combination of means for cutting and turning a furrow slice, a guide separate from the cutting means disposed to limit the outwardly and upward movement of the slice, and an inturned ledge at the bottom of said guide, disposed to arrest the slice against turning, and extending rearwardly and downwardly to direct the outer edge of the slice outwardly, and downwardly.

7. In a plow, the combination of means for cutting and turning a furrow slice, a guide separate from said means, for receiving the slice from said means, and movably mounted with respect to the turning means, and a stop disposed inwardly of the outer side of said guide and having fixed relation to the guide and disposed to arrest and support the outer edge of the slice.

8. In a plow, the combination of means for cutting and turning a furrow slice, a guide separate from said means, for receiving the slice from said means and yieldingly mounted with respect to the turning means, and a stop disposed inwardly of the outer side of said guide and having fixed relation to the guide and disposed to arrest and support the outer edge of the slice.

9. In a plow, the combination of means for cutting and turning a furrow-slice, a guide separate from said means for receiving the slice from the turning-means, means for yieldingly sustaining the guide so its disposition with respect to the turning-means may vary, and a stop on said guide disposed in the slice path to positively limit the turning of the slice and extended rearwardly and downwardly so the outer edge of the furrow-slice will ride thereon to the ground.

10. In a plow, the combination of means for cutting and turning a furrow-slice, a guide separate from said means formed to limit the upward and outward movement of the slice, means for yieldingly sustaining said guide so its disposition with respect to the turning-means may vary, and a stop on said guide projecting into the slice path to support it and to limit the turning of the slice.

11. In a plow, the combination of means for cutting and turning a furrow-slice, a guide for receiving the slice from the turning-means and formed to limit upward and outward movement of the slice, and a plurality of stops for positively limiting the turning of the slice.

12. In a plow, the combination of means for cutting and turning a furrow-slice, a guide for receiving the slice from the turning-means and formed to limit the upward and outward movement of the slice, means for yieldingly sustaining said guide, a stop-ledge at the lower edge of said guide for limiting the turning of the slice, and a stop-bar below said ledge for limiting the turning of a slice.

13. In a plow, the combination of a disk for cutting and turning a furrow-slice, a guide for receiving a slice cut by the disk, and an inwardly projecting ledge at the bottom of said guide against which the outer edge of the slice will be projected so its turning movement will be positively limited thereby.

14. In a plow, the combination of a disk for cutting and turning a furrow-slice, a guide for receiving a slice cut by the disk, and an inwardly projecting ledge at the bottom of said guide against which the outer edge of the slice will be projected so its turning-movement will be limited thereby, said ledge being extended rearwardly and downwardly to guide the slice to the ground.

15. In a plow, the combination of a disk for cutting and turning a furrow-slice, a guide for limiting the upward and outward movement of the slice, and a plurality of stops for positively limiting the turning of the slice, one of said stops being secured to said guide.

16. In a plow, the combination of a disk for cutting and turning a furrow-slice, a guide for limiting upward and outward movement of the slice, a ledge at the lower edge of said guide, and a stop-bar below said ledge.

17. In a plow, the combination with means for cutting and turning a furrow-slice, a guide for limiting the outward movement of the slice, a stop at the lower edge of said guide for limiting the turning of the slice and means for guiding the inner edge-portion of the inverted slice.

18. In a plow, the combination of a disk for cutting and turning a furrow-slice, a guide for limiting outward movement of the slice, a stop at the lower edge of said guide for limiting turning of the slice, and means for guiding the inner edge-portion of the inverted slice.

19. In a plow, the combination of a disk for cutting and turning a furrow-slice, a guide for receiving the slice cut by the disk and formed to limit the upward and outward movement of the slice, a stop at the lower edge of said guide for limiting the turning of the slice, and a bar below said guide provided with means for guiding the inner edge-portion of the slice.

20. In a plow, the combination of a disk for cutting and turning a furrow-slice, a guide for receiving the slice cut by the disk and formed to limit upward and outward movement of the slice, a stop at the lower edge of said guide for limiting the turning of the slice, and a bar below said guide provided with means for guiding the inner edge-portion of the slice, said stop and said bar being extended downwardly and rearwardly to guide the slice.

21. In a plow, the combination of a disk for cutting and turning a furrow-slice, a guide for receiving the slice cut by the disk and formed to limit upward and outward movement of the slice, a stop at the lower edge of said guide for limiting the turning of the slice, and a bar below said guide provided with means for guiding the inner edge-portion of the slice, said stop and said bar being extended downwardly and rearwardly to guide the slice, said bar being extended inwardly at its rear to guide the inner portion of the slice.

CLINTON W. DICKINSON.

Witnesses:
M. M. BERGANS,
F. G. BOSSHARD.